I* *I

US010137953B2

(12) United States Patent
Kuchler et al.

(10) Patent No.: US 10,137,953 B2
(45) Date of Patent: Nov. 27, 2018

(54) SECURING DEVICE

(71) Applicant: ABUS August Bremicker Söhne KG, Wetter-Volmarstein (DE)

(72) Inventors: Marcus Kuchler, Munich (DE); Ernst Pankratius, Wetter (DE)

(73) Assignee: ABUS AUGUST BREMICKER SÖHNE KG, Wetter-Volmarstein (DE)

( * ) Notice: Subject to any disclaimer, the term of this patent is extended or adjusted under 35 U.S.C. 154(b) by 137 days.

(21) Appl. No.: 15/333,555

(22) Filed: Oct. 25, 2016

(65) Prior Publication Data
US 2017/0120975 A1 May 4, 2017

(30) Foreign Application Priority Data

Oct. 27, 2015 (DE) .................... 10 2015 118 311

(51) Int. Cl.
*F16B 21/00* (2006.01)
*B62H 5/00* (2006.01)
(Continued)

(52) U.S. Cl.
CPC .............. *B62H 5/00* (2013.01); *B62H 5/001* (2013.01); *B62K 25/02* (2013.01); *F16B 41/005* (2013.01);
(Continued)

(58) Field of Classification Search
CPC ........ B62H 5/145; B62H 5/006; B62H 5/004; B60B 27/02; B62B 5/00
See application file for complete search history.

(56) References Cited

U.S. PATENT DOCUMENTS 1,945,857 A * 2/1934 Harter ................. H01R 4/34
411/384
2,822,986 A * 2/1958 Schreier .................. E01B 9/14
238/377
(Continued)

FOREIGN PATENT DOCUMENTS

CN 2521330 Y 11/2002
DE 29610148 U1 8/1996
(Continued)

*Primary Examiner* — Gary W Estremsky
(74) *Attorney, Agent, or Firm* — Harness, Dickey & Pierce, P.L.C.

(57) ABSTRACT

A securing device for securing a component to an object comprises a fastening element having an engagement section and having a longitudinal axis, wherein the fastening element is selectively connectable to a counter element by actuating the engagement section; and a cover sleeve which is movably supported at the fastening element between a closed position in which the cover sleeve prevents an actuation of the engagement section and an open position in which the cover sleeve allows an actuation of the engagement section. At least one blocking element is provided between the fastening element and the cover sleeve, said blocking element being freely movable in the closed position of the cover sleeve between a latched position in which it blocks the cover sleeve in the closed position and an unlatched position in which it allows a movement of the cover sleeve into the open position. The blocking element is further supported between the fastening element and the cover sleeve such that, when the cover sleeve is in the closed position, it adopts the latched position due to gravity in a normal alignment of the longitudinal axis of the fastening element and it adopts the unlatched position due to gravity in an installation alignment of the longitudinal axis of the fastening element perpendicular to the normal alignment.

20 Claims, 3 Drawing Sheets

(51) Int. Cl.
  *B62K 25/02*   (2006.01)
  *F16B 41/00*   (2006.01)
  *E05B 71/00*   (2006.01)
  *B60B 27/02*   (2006.01)
  *B60B 35/04*   (2006.01)
  *B62H 5/04*   (2006.01)

(52) U.S. Cl.
  CPC ............. *B60B 27/023* (2013.01); *B60B 35/04* (2013.01); *B62H 5/006* (2013.01); *B62H 5/04* (2013.01); *E05B 71/00* (2013.01)

(56) References Cited

U.S. PATENT DOCUMENTS

| | | | |
|---|---|---|---|
| 3,138,393 A * | 6/1964 | Livingston | F16L 37/23 |
| | | | 279/75 |
| 3,930,428 A | 1/1976 | Hale | |
| 3,965,708 A | 6/1976 | Smiley | |
| 4,151,897 A | 5/1979 | Schoch | |
| 4,324,119 A | 4/1982 | Mitton | |
| 4,674,306 A | 6/1987 | Halpern | |
| 5,087,173 A * | 2/1992 | Uliana | F16D 1/06 |
| | | | 29/464 |
| D325,332 S | 4/1992 | Oberhelman et al. | |
| D352,223 S | 11/1994 | Shieh | |
| 5,653,365 A | 8/1997 | Lee | |
| D389,031 S | 1/1998 | Lam | |
| 5,749,690 A * | 5/1998 | Kutz | F16B 41/005 |
| | | | 411/372.6 |
| 5,803,689 A * | 9/1998 | Magnus | E21B 41/0007 |
| | | | 24/607 |
| 5,950,506 A | 9/1999 | Busse | |
| D414,675 S | 10/1999 | Niswanger | |
| 6,457,336 B1 | 10/2002 | Bremicker | |
| 6,616,168 B2 * | 9/2003 | Belinky | B60D 1/06 |
| | | | 280/491.5 |
| 7,967,538 B1 * | 6/2011 | Coope | F16B 41/002 |
| | | | 411/348 |
| 8,156,774 B2 * | 4/2012 | Tribout | B62H 5/001 |
| | | | 411/128 |
| D700,037 S | 2/2014 | Lohmann | |
| 2002/0139153 A1 | 10/2002 | Tsai | |
| 2010/0206021 A1 | 8/2010 | Tribout et al. | |
| 2010/0212380 A1 | 8/2010 | Tribout | |
| 2014/0178147 A1 | 6/2014 | Lin | |

FOREIGN PATENT DOCUMENTS

| | | |
|---|---|---|
| EP | 0853034 A2 | 7/1998 |
| FR | 2885344 A1 | 11/2006 |
| WO | WO-2009027734 A2 | 3/2009 |
| WO | WO-2011029591 A1 | 3/2011 |

\* cited by examiner

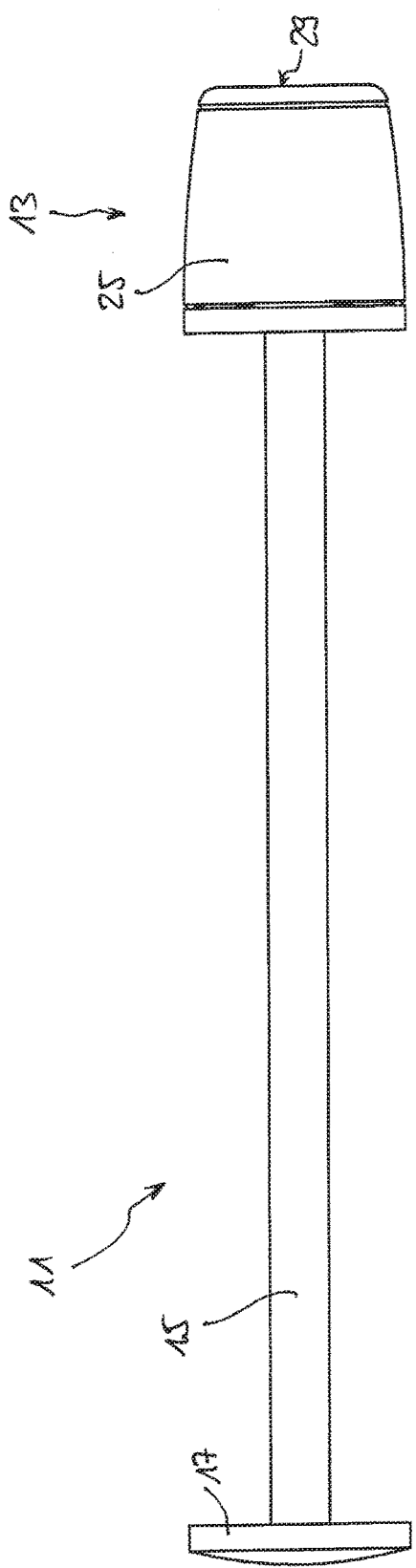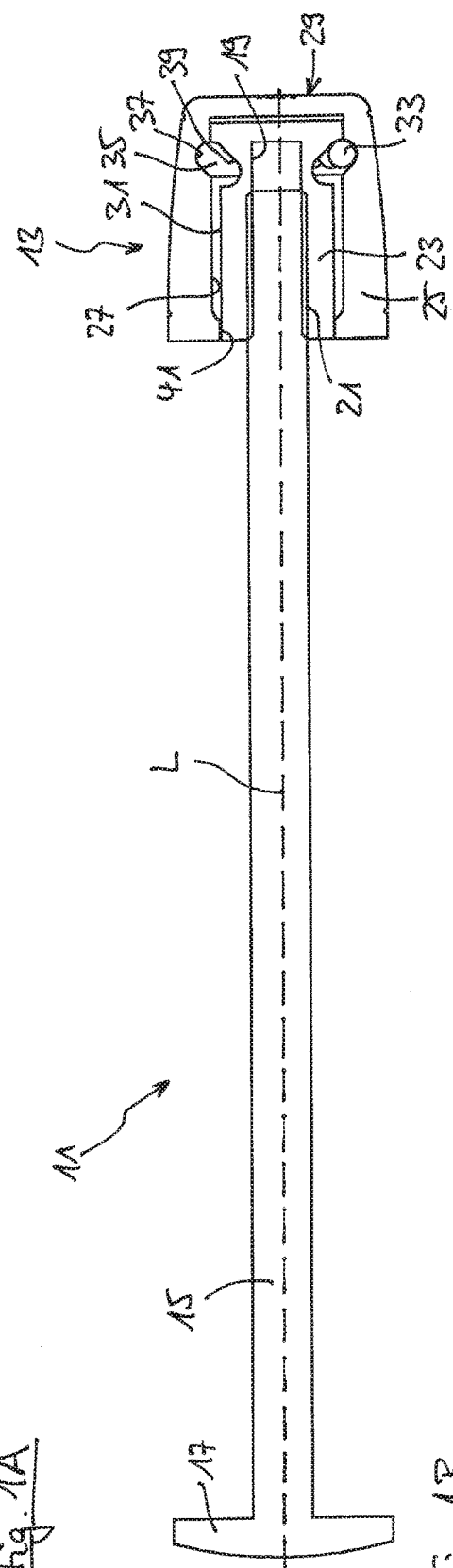
Fig. 1A
Fig. 1B

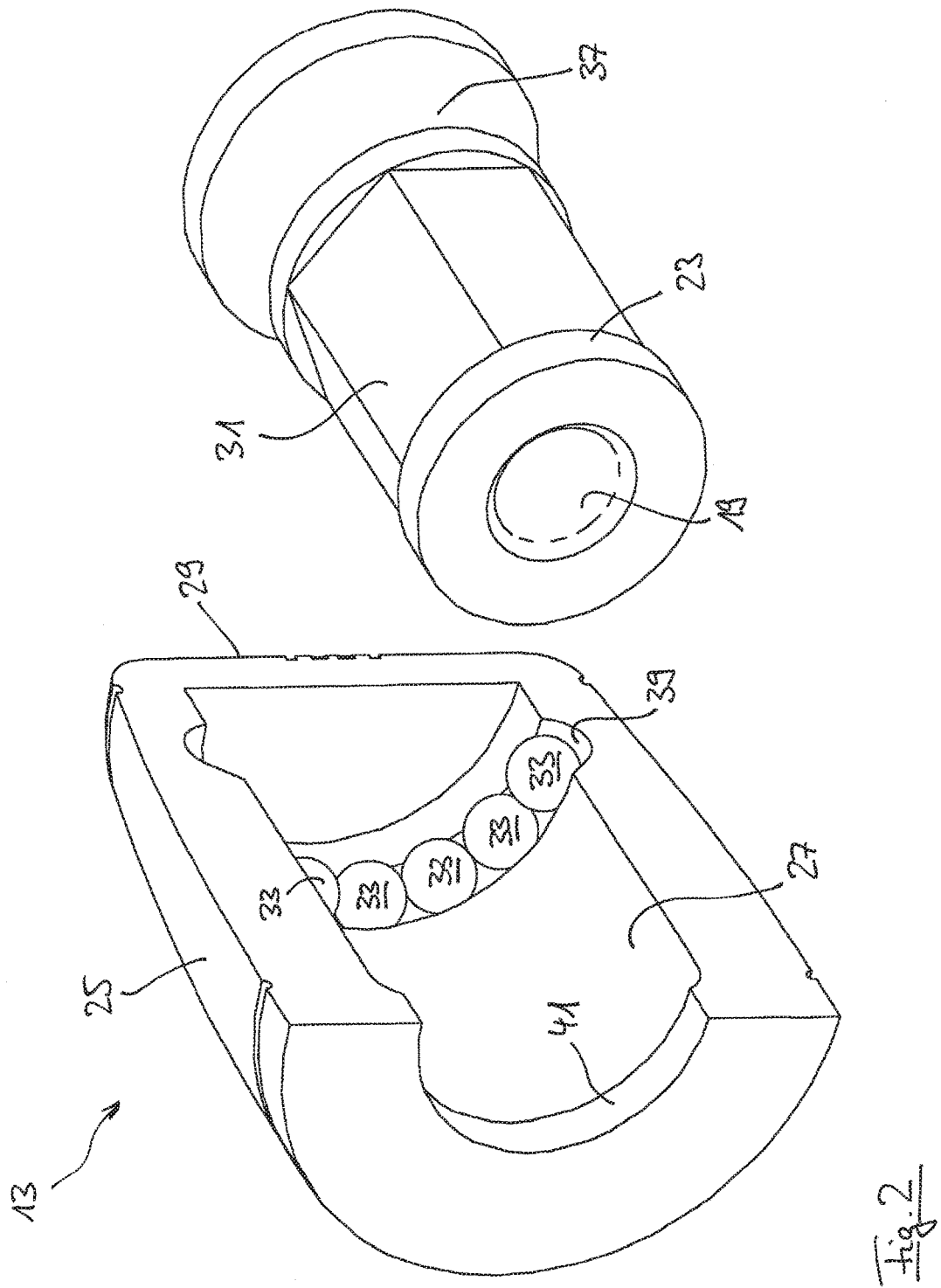

SECURING DEVICE

The present invention relates to a securing device for securing a component to an object, in particular to a two-wheeler.

It is generally known to secure a two-wheeler against theft in that the two-wheeler is connected to a stationary object. In this respect, however, all components of the two-wheeler are not directly connected, but typically only at least the frame and, optionally, one of the wheels of the two-wheeler. The remaining components are then secured indirectly, if at all, by their fastening to the directly secured components.

The fastening of such indirectly secured components is, however, generally releasable. The risk of a theft of a respective component is therefore the greater, the simpler the fastening can be released. A simple releasability can, however, be desired for reasons of comfort in order, for example, to facilitate a replacement or an adjustability of the component. Specific components, in particular wheels, saddles, brakes and handlebars, of two-wheelers are therefore frequently fastened to the frame of the two-wheeler by means of so-called quick-release skewers or by means of other fastening devices which are easy to release. As a result of this, thefts of such components on actually securely connected two-wheelers increasingly occur.

The general problem of securing a component of an object otherwise secured in its position reliably and nevertheless simply releasably to this object is in this respect not only a problem with two-wheelers.

It is therefore an object of the invention to provide a securing device for securing a respective component to an associated object which can, on the one hand, reliably secure the component against an unauthorized release from the object and can, on the other hand, allow a simple release of the component.

The object is satisfied by a securing device having the features of claim 1.

The securing device comprises a fastening element having an engagement section and a longitudinal axis. By actuating the engagement section the fastening element can be selectively connected to a counter-element in order to fasten the component to the object in a connected state of the fastening element and in order to release the component for removal from the object in a disconnected state of the fastening element. The securing device further comprises a cover sleeve. The cover sleeve is movably supported at the fastening element between a closed position in which the cover sleeve prevents an actuation of the engagement section of the fastening element and an open position in which the cover sleeve allows an actuation of the engagement section. At least one blocking element is provided between the fastening element and the cover sleeve, said blocking element being freely movable in the closed position of the cover sleeve between a latched position in which it blocks the cover sleeve in the closed position and an unlatched position in which it allows a movement of the cover sleeve into the open position. The blocking element is supported between the fastening element and the cover sleeve such that, when the cover sleeve is in the closed position, it adopts the latched position due to gravity in a normal alignment of the longitudinal axis of the fastening element (i.e. in an alignment of normal use) and it adopts the unlatched position due to gravity in an installation alignment of the longitudinal axis of the fastening element perpendicular to the normal alignment.

The fastening element, together with the cover sleeve and the blocking element, on the one hand, and the counter-element, on the other hand, in this respect in particular form a fastening device for fastening the respective component to the object. If the object is a two-wheeler, the fastening device can, for example, be the axle of a wheel hub via which a wheel of the two-wheeler is fastened to its frame or it can be the clamping pin of a circlip by which the saddle support of a saddle or the stem shaft of the handlebars is fastened to the frame.

The fastening element can in particular be configured in the manner of a nut or screw which can be connected to the counter-element via corresponding threads. In general, however, other kinds of connection, e.g. latching, clamping and/or eccentrically clamping, are also possible.

The fastening device can in this respect generally be very similar to a conventional fastening device. The counter-element can in particular be configured in a known manner so that a conventional fastening device can be retrofitted by replacing the fastening element with the securing device in accordance with the invention.

The invention therefore relates, on the one hand, to the securing device alone, which is usable in conjunction with a suitable counter-element, as well as, on the other hand, to a fastening device which comprises both the securing device and the counter-element.

In general, the counter-element does not have to be separate from the object to which the respective component should be secured, but can rather also be configured integrally thereat, for instance. The counter-element can, for example, be a threaded bore of the associated object, with the fastening element being able to have a threaded portion which is screwed into the threaded bore. The counter-element can, however, also be configured in the manner of a pin and can have an external thread onto which the fastening element is screwed in the manner of a nut to fasten the component to the object.

The fastening element has the named engagement section, via which the fastening element can be actuated, for connecting the fastening element to the counter-element. The actuation in this respect serves for the connection of the fastening element to the counter-element or for the disconnection of the fastening element from the counter-element. It may be necessary to use the engagement section for such a reliable actuation of the fastening element.

For example, the engagement section can be formed by a comparatively simple entrainer profile, such as a hexagon head or a hexagon socket, at which a corresponding (hexagonal) wrench can engage. No special tool is then required to actuate the engagement section. The engagement section can generally also have a more complex profile. The engagement section can, however, also be configured less specifically. The engagement section can thus, for instance, comprise a jacket surface, an external surface or a top surface of the fastening element (e.g. having a grooving for a manual rotational actuation). In this respect, the engagement section can in particular be defined in that at least one releasing actuation of the fastening element is not possible under normal circumstances without access to this engagement section.

To secure the connection of the fastening element to the counter-element, the actuation of the engagement section can be prevented by the cover sleeve. In this respect, the actuation is not possible when the cover sleeve is in its closed position from which the cover sleeve cannot be easily transposed into the open position allowing an actuation of the engagement section.

Whether the cover sleeve can be transposed into the open position or not in this respect depends on the position (unlatched position or latched position) in which the blocking element is. The position of the blocking element in turn depends on how the longitudinal axis of the fastening element is aligned. For, depending on the alignment of the longitudinal axis, the blocking element automatically adopts the respective position corresponding to the alignment due to gravity.

Ultimately, the securing device is therefore so-to-say automatically switched between a latched state and an unlatched state as a result of the alignment of the longitudinal axis of the fastening element. In this respect, the named normal alignment preferably corresponds to the alignment which the longitudinal axis of the fastening element adopts in a position of use of the object. In a two-wheeler, such a position of use is, for example, present when the two-wheeler is standing on both its wheels on a substrate and is substantially aligned in a plane perpendicular to the substrate. The component secured by means of the securing device is as a rule consequently secured against a release in the typical use of the object.

The blocking element has to be moved into its unlatched position for unlatching the securing device. The blocking element is preferably not accessible from outside the securing element and can therefore not be directly transposed. The blocking element can therefore be moved at least substantially exclusively into the unlatched position in that the longitudinal axis of the fastening element is moved into the installation alignment.

In this respect, the installation alignment does not necessarily have to be completely reached, that is the longitudinal axis does not have to be rotated by exactly 90°. The blocking element can rather already adopt the unlatched position or at least exit the latched position due to gravity before reaching the installation alignment. It is, however, advantageous in this respect if slight deviations from the normal alignment are not yet sufficient for an exiting of the latched position. At least a deviation of approximately 45° from the normal alignment can in particular be required so that the blocking element exits the latched position.

Since the securing device is arranged in a stable manner at the associated object as a rule in use, the total object therefore has to be aligned in accordance with the installation alignment of the longitudinal axis of the fastening element to unlatch the securing device. This in particular corresponds to a tilt of the object by approximately 90° from the named position of use. Such a new alignment of the object is, however, at least not possible as a rule when the object is in turn sufficiently secured. For example, a two-wheeler can be tightly connected by means known per se such as a stationary article such as a post, grid, fence or bike stand so that it cannot be tilted by up to 90° onto one of its sides.

When the two-wheeler (or another object secured to the securing device) is therefore parked in a normal manner and is reliably connected somewhere, the desired securing of the respective component is thus simultaneously reached. The additional securing of the component in this respect results automatically in that no latching actuation of the securing device is necessary. The securing device is rather generally anyway in the secured state in the position of use of the two-wheeler. The securing of the component to be secured can therefore also not be accidentally forgotten. The securing is in this respect only completed by the usual connection of the two-wheeler to the extent that an unlatching of the securing device is thereby prevented.

The advantageous use of the securing device is not restricted to two-wheelers. Other areas of application comprise, for example, the securing of components to parts of construction machinery or construction units, agricultural units, all kind of motor vehicles, etc., in particular when these parts are only movable by the authorized user. This can, for example be the case on a pivoting of a rear vehicle flap after its unlatching, with a motor-powered for hydraulic pivoting of a support arm of a construction machine or of an agricultural unit, or with a motor-powered drive of a vehicle wheel by a quarter-revolution.

The component remains easily releasable from the object despite the automatic securing of the component against an unauthorized release from the object. The object (for example a two-wheeler) for this purpose only has to be tilted, rotated or pivoted (e.g. placed on one of its sides) by approximately 90° (at least temporarily) in order thereby to be aligned in accordance with the installation direction. As a result of the tilting, the blocking element automatically moves into the unlatched position due to gravity and thereby releases the cover sleeve for a transposition into the open position in which the engagement section of the fastening element is then accessible for a releasing actuation of the fastening element.

As long as the cover sleeve is transposed into the open position and is held in the open position, the alignment of the longitudinal axis of the fastening element (and thus also the alignment of the two-wheeler) can preferably be changed (can in particular be brought into the normal alignment again) without the securing device thereby being latched. With a normal alignment of the longitudinal axis of the fastening element, the fastening element is only again blocked by the blocking element against a releasing actuation when the cover sleeve again adopts its closed position.

The release, adjustment or replacement of the component is hereby simplified. For the object does not need to be aligned during the whole process in accordance with the installation alignment. It is rather sufficient if the installation alignment is adopted briefly to transpose the cover sleeve into the open position and to make the engagement section accessible. The object can subsequently be aligned as desired without the engagement section of the fastening element becoming inaccessible again.

With a two-wheeler, for example, the two-wheeler can first be placed on its side for the removal of a wheel, whereby the cover sleeve can be transposed into the open position and the two-wheeler can subsequently be placed on the saddle and handlebars so that the two-wheeler has a stable position on the release of the fastening element (e.g. unscrewing the counter-element) and on the removal of the wheel. If a circlip is, for example, secured to the saddle tube of a two-wheeler by the securing device, the two-wheeler can be immediately set upright into the normal alignment again after the transposition of the cover sleeve into the open position from the installation position to be able to adjust the saddle.

The installation alignment preferably does not again have to be adopted for a latching of the securing device. As soon as the cover sleeve is transposed into the closed position, the blocking element can again adopt the latched position due to gravity and in dependence on the alignment of the longitudinal axis of the fastening element. If the cover sleeve is transposed into the closed position in the normal alignment, the latching therefore automatically takes place immediately.

Preferably only the alignment of the longitudinal axis of the fastening element is decisive with respect to which position (latched position or unlatched position) the blocking element adopts, but not the rotational alignment of the fastening element relative to the longitudinal axis. This has the advantage that a fastening device having such a securing device can be arranged at the two-wheeler in any desired rotational alignment with respect to the longitudinal axis. If the fastening device is, for instance, the axle of a wheel hub or the clamping pin of a circlip, it is not necessary to take account of a correct rotational alignment relative to the longitudinal axis on the installation at the two-wheeler, whereby the installation is substantially facilitated. This is in particular important when a specific rotational alignment of the fastening element automatically results as the end position and when the rotational alignment of the fastening element can thus not be freely selected on the installation (e.g. on a complete screwing of a screw into a threaded bore).

It is therefore preferred if the blocking element is supported between the fastening element and the cover sleeve such that it adopts the latched position and the unlatched position independently of a rotational alignment or rotational position of the fastening element relative to the longitudinal axis.

This has the advantage that the securing device does not have to be installed in a more complicated manner than a corresponding conventional fastening device. The securing device only has to be attached to the object whose component is to be secured in a conventional manner by connecting the fastening element to the counter-element. It is advantageously not necessary in this respect to take special note of a correct alignment relative to the longitudinal axis, in particular of a correct rotational alignment of the fastening element.

The latched position and the unlatched position can in particular be defined axially and/or radially relative to the longitudinal axis and can be independent of the position of the blocking element in the peripheral direction with respect to the longitudinal axis.

In the normal alignment, the longitudinal axis of the fastening element can in particular extend in the horizontal direction, whereas the longitudinal axis extends in the vertical direction in the installation alignment. The force effect onto the blocking element thereby takes place as a result of gravity in parallel with the longitudinal axis in the one case and perpendicular thereto in the other case. The different force effects can thereby be separated particularly well.

In accordance with an embodiment, the cover sleeve is movably supported at the fastening element along the longitudinal axis of the fastening element between the closed position and the open position. The closed position and the open position are therefore defined axially with respect to the longitudinal axis. The cover sleeve can generally have an additional movability, for instance in the rotational direction about the longitudinal axis, which has no effect on the open position and on the closed position, however.

The cover sleeve can in particular have a reception section into which the fastening element is received, wherein the engagement section of the fastening element is completely received in the reception section of the cover sleeve in the closed position. An actuation of the engagement section is consequently prevented in the closed position of the cover sleeve in that the engagement section cannot be reached from outside the cover sleeve.

The cover sleeve preferably has a cylindrical basic shape which can be configured as hollow such that the reception section extends along a cylinder axis of the basic shape in the interior of the cover sleeve. The reception section can generally extend through the total cover sleeve which is then open in tubular form relative to both axial sides (with respect to the cylinder axis). The cover sleeve is, however, preferably closed toward an axial side to prevent an access to the fastening element from this side.

It is generally advantageous if the cover sleeve is connected unreleasably to the fastening element, at least in normal use, so that the cover sleeve cannot be lost. To prevent a release of the cover sleeve from the fastening element, the reception section can, for example have a reduced diameter portion against which the blocking element abuts when the cover sleeve is in the open position. The cover sleeve can then not be transposed beyond the open position. The cover sleeve can therefore in particular not be removed from the fastening element.

In an embodiment, the fastening element is configured to be rotated about its longitudinal axis for the connection to the counter-element, for example if the fastening element is functionally configured in the manner of a nut or of a screw. The fastening element can have a thread coaxial to the longitudinal axis for this purpose to cooperate with a corresponding thread of the counter-element.

The cover sleeve is preferably supported freely rotatably about the longitudinal axis at the fastening element. A rotation of the cover sleeve is therefore not transmitted to the fastening element. The cover sleeve rather freewheels such that the fastening element is secured against a rotational actuation from the outside in the closed position of the cover sleeve.

It is furthermore preferred if the latched position and the unlatched position of the blocking element differ both with respect to their radial arrangement and with respect to their axial arrangement relative to the longitudinal axis. A movement of the blocking element from the latched position into the unlatched position or vice versa is therefore not a purely axial or purely radial movement, but rather has both axial portions and radial portions. The movability of the blocking element can thereby easily be adapted to the transition from the normal alignment into the installation alignment and vice versa. The extent of the movability of the blocking element can in particular be configured to move the blocking element reliably into the corresponding position due to gravity in dependence on the alignment.

In an embodiment, the latched position and the unlatched position of the blocking element are aligned obliquely with respect to the longitudinal axis, in particular at an angle of approximately 45° with respect to one another. In this respect, the movability of the blocking element between the latched position and the unlatched position can in particular be linear or arcuate. At an alignment of approximately 45° to the longitudinal axis, the axial portion and the radial portion of the movability are just at least substantially of equal size so that a transition from the latched position into the unlatched position or vice versa takes place substantially just at the center between the normal alignment and the installation alignment.

The fastening element preferably has an outer groove which runs around the longitudinal axis and which is configured to at least partly receive the blocking element. The outer groove can in this respect be formed in an cylinder jacket surface of the fastening element and/or can be rotationally symmetrical. In accordance with the above-described movability of the blocking element, a cross-section of the outer groove can have a longitudinal extent which is aligned at least sectionally obliquely with respect to the longitudinal axis of the fastening element, in particular at an angle of approximately 45°.

It is furthermore preferred if the cover sleeve has an inner groove which runs around the longitudinal axis and which is configured to at least partly receive the blocking element. The inner groove can in particular be formed in an inner cylinder jacket surface of the cover sleeve which radially bounds the named reception section. The cross-section of the inner groove also preferably has a longitudinal extent which is aligned at least sectionally obliquely with respect to the longitudinal axis of the fastening element, in particular at an angle of approximately 45°.

It is particularly advantageous if both the fastening element has the named outer groove and the cover sleeve has the named inner groove, wherein the blocking element is partly received in the outer groove of the fastening element and is partly received in the inner groove of the cover sleeve when the cover sleeve is in the closed position and the longitudinal axis of the fastening element is in the normal alignment.

In the normal alignment of the longitudinal axis of the fastening element, the blocking element automatically adopts the latched position due to gravity when the cover sleeve is in the closed position. The latching can therefore in particular be effected in this embodiment in that the blocking element engages both into the outer groove of the fastening element and into the inner groove of the cover sleeve. The blocking element can in this manner block an axial movement of the cover sleeve into the open position in cooperation with a side surface of the outer groove and with an axially opposite side surface of the inner groove.

If, in contrast, the longitudinal axis of the fastening element is in the installation alignment, the blocking element is preferably admittedly at least partly received in the outer groove of the fastening element, but does not engage into the inner groove of the cover sleeve. The blocking element is automatically moved into the unlatched position due to gravity by the installation alignment. Said unlatched position can therefore in particular differ from the latched position in that the blocking element no longer engages into both grooves (outer groove of the fastening element and inner groove of the cover sleeve), but rather only into one of the two grooves, preferably into the outer groove. The blocking element therefore no longer blocks an axial transposition of the two grooves relative to one another. The cover sleeve can consequently be transposed from the closed position relative to the fastening element.

In accordance with an embodiment, the depth of the outer groove of the fastening element is greater than the depth of the inner groove of the cover sleeve in the radial direction with respect to the longitudinal axis. The depth of the outer groove can in particular correspond to an extent of the blocking element in the radial direction or can be larger, wherein this extent can correspond to a diameter of the blocking element with a blocking element of a spherical basic shape. The depth of the outer groove and the depth of the inner groove are in this respect related to an inner jacket surface of the cover sleeve in which the inner groove is formed.

In an embodiment in which the fastening element has an outer groove and the cover sleeve has an inner groove, it can be advantageous independently of or in addition to the above embodiments if the outer groove of the fastening element and the inner groove of the cover surface form a ring channel in the closed position of the cover sleeve and the blocking element is supported freely movable in said ring channel. The outer groove and the inner groove can in particular be adjacent to one another in the closed position of the cover sleeve so that they form the ring channel together.

The blocking element is preferably freely movable within the ring channel. The blocking element can in this respect in particular not only be movable axially and/or radially with respect to the longitudinal axis between the latched position and the unlatched position, but can rather run through the whole ring channel around the longitudinal axis. This contributes to the fact that the securing device can be installed at a two-wheeler in any desired rotational alignment with respect to the longitudinal axis. The position of the blocking element in the peripheral direction preferably does not play any role in this respect for the latched position and for the unlatched position. Depending on the radial spacing of the blocking element from the longitudinal axis, however, the blocking element penetrates the cylindrical dividing gap between the fastening element and the cover sleeve and thus blocks an axial relative movement of these two elements.

The ring channel is preferably rotationally symmetrical to the longitudinal axis. The ring channel therefore has the same radius and cross-section over its total extent.

The cross-section of the ring channel can in particular define an extent of the blocking element between the latched position and the unlatched position. In this respect, the extent can generally be in a straight line or can also be at least partly arcuate or angular. The cross-section of the ring channel can in particular be aligned sectionally or completely obliquely, in particular at an angle of approximately 45° to the longitudinal axis of the fastening element. Due to the respective extent, it can in so doing be monitored at which respective angle the blocking element exits the latched position in the course of a transition from the normal alignment into the installation alignment or vice versa, at which angle it adopts the unlatched position, at which angle it exits the unlatched position and at which angle it adopts the latched position.

The cross-section of the ring channel has a longitudinal extent in accordance with an embodiment along which the blocking element is linearly movable between the latched position and the unlatched position and which is aligned obliquely, in particular at an angle of approximately 45°, to the longitudinal axis. This cross-section can in particular result from the connection of the described cross-sections of the outer groove and of the inner groove. The oblique alignment can then, in a simple construction manner, be the cause for the gravity-induced movement of the blocking element into the latched position or into the unlatched position depending on the alignment of the longitudinal axis of the fastening element. The oblique side surfaces of the ring channel can in this respect act as a ramp along which the blocking element slides downward in a respective different direction depending on the tilt direction of the ramp.

In accordance with a preferred embodiment, a plurality of blocking elements are provided which extend, strung together, over at least one third, in particular at least half, of the periphery of the ring channel. In this manner, the force which acts on the individual blocking element when an attempt is made with a latched securing device to transpose the cover sleeve into the open position can be reduced since the total force is distributed over the plurality of blocking elements.

The invention will be described in more detail in the following only by way of example with reference to the drawings.

FIGS. 1A and 1B show an embodiment of a fastening device with a securing device in accordance with the invention in a side view and a longitudinal section respectively;

FIG. 2 shows the securing device of FIG. 1 in a partly sectional representation with a separate fastening element.

Figure 3C:
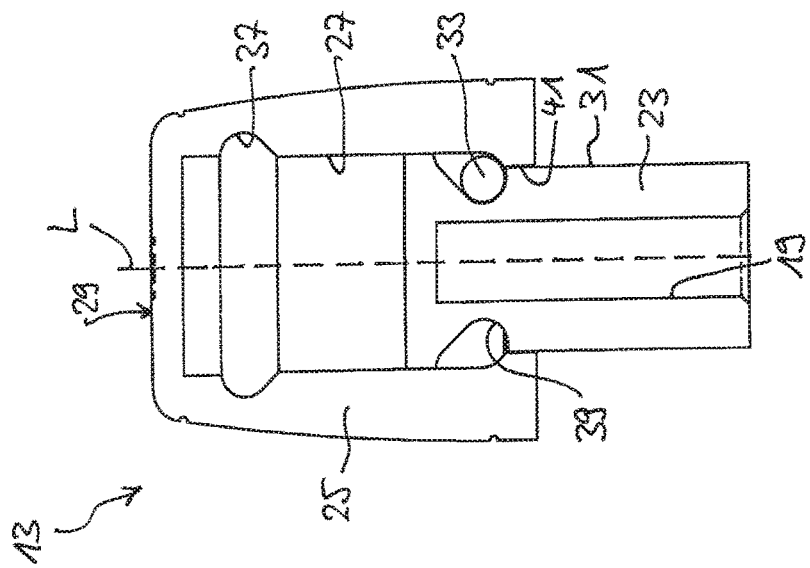
FIGS. 3A to 3C show longitudinal sections of the securing device in different states.

The fastening device 11 shown in FIG. 1 is the axle of a wheel hub which is used for fastening a wheel to the frame, in particular to the fork, of a two-wheeler (not shown). The fastening device 11 comprises a securing device 13, which acts as a nut, and an elongate pin, which acts as a screw, as a counter-element 15 and which has a flat head 17 at its end facing away from the securing device 13. The head 17 comprises in a manner known per se a projection, not shown, to engage into a corresponding recess at the fork so that the head 17 can be arranged substantially rotationally fixedly at the fork.

The securing device 13 has a threaded bore 19 having an internal thread into which the pin 15 can be screwed to different depths via a corresponding external thread 21. The spacing between the head 17 and the securing device 13 can thereby be changed to clamp the fastening device 11 in a known manner in a stable fashion between the two ends of the fork.

The fastening device 11 is substantially rotationally symmetrical with respect to a longitudinal axis L. When the fastening device 11 is installed and the two-wheeler is in its typical position of use, the longitudinal axis L is aligned horizontally, as shown in FIG. 1. This alignment corresponds to a normal alignment of the longitudinal axis L to this extent.

As the longitudinal sectional representation of FIG. 1B shows, the securing device 13 is formed in multiple parts and comprises a fastening element 23, which has the threaded bore 19, and a cover sleeve 25 placed onto the fastening element 23. The cover sleeve 25 has a cylindrical basic shape. A reception section 27 extends, starting from an axial end of the cover sleeve 25, in parallel with the longitudinal axis L into the cover sleeve 25. The other axial end of the cover sleeve 25 is closed by an end face 29.

The fastening element 23 is completely received in the reception section 27 in the shown closed position of the cover sleeve 25. An engagement section 31 formed at an outer peripheral surface of the fastening element 23 is thereby in particular covered so that it is not accessible from the outside. The engagement section 31 is formed as a hexagon head (cf. FIG. 2) and generally makes it possible to rotate the fastening element 23 about the longitudinal axis L by means of a corresponding screw wrench (not shown) to connect it to or disconnect it from the counter-element 15.

The cover sleeve 25 is supported at the fastening element 23 freely rotatable about the longitudinal axis L. The fastening element 23 can therefore not be unscrewed from the counter-element 15 by means of the cover sleeve 25. Since the open axial end of the cover sleeve 25 of the securing device 13 contacts the fork when the fastening device 11 is used in the usual manner, the fastening element 23 is also not accessible from this side. A release of the fastening element 23 from the counter-element 15 is therefore only possible when the cover sleeve 25 is transposed axially in the direction facing away from the counter-element 15 into its open position and the engagement section 31 of the fastening element 23 thus becomes accessible for an actuation.

A transposition of the cover sleeve 25 into the open position is, however, prevented by blocking elements 33 in the form of spheres which are supported, generally freely movable, between the fastening section 23 and the cover sleeve 25, as will be explained in more detail in the following. Ten blocking elements 33 are provided in total which extend, strung together, over approximately more than half the periphery of the ring channel 35. In the normal position of the longitudinal axis L, the blocking elements 33 therefore each fill the lower half of the ring channel 35 due to gravity.

The ring channel 35 is formed by an outer groove which is formed at the fastening element 23 and which runs about the longitudinal axis L as well as by an inner groove 39 which is formed at the cover sleeve 25 and which runs about the longitudinal axis L (cf. in particular FIG. 2). The cross-section (with respect to the peripheral direction) of the ring channel 35 has a longitudinal extent which is aligned at an angle of 45° to the longitudinal axis L. The blocking elements 33 are therefore simultaneously movable both radially and axially along this longitudinal extent between two limit positions.

In the normal alignment of the longitudinal axis L shown in FIG. 1, at least the blocking elements 33 which are located beneath the longitudinal axis L (that is all the blocking elements 33 in the embodiment shown) adopt that limit position due to gravity which is spaced radially further from the longitudinal axis L. In this position, the blocking elements 33 pass through the separating gap between the fastening element 23 and the cover sleeve 25 and therefore engage both into the outer groove 37 and into the inner grove 39, as can in particular be recognized in FIG. 3A. The blocking elements 33 thereby block an axial movement of the cover sleeve 25 into its open position in cooperation with a side surface of the outer groove 37 and an axially oppositely disposed side surface of the inner groove 39. This limit position is consequently the latched position of the blocking elements 33.

The other limit position accessible through the longitudinal extent of the ring channel 35 is arranged radially closer to the longitudinal axis L and axially further in the direction toward the counter-element 15. This limit position is therefore adopted due to gravity when the securing device 13 is aligned such that the longitudinal axis L of the fastening element 23 adopts the installation alignment shown in FIG. 3B. In this alignment, the longitudinal axis L is aligned vertically, with the securing device 13 being arranged vertically above the counter-element 15. The limit position adopted by the blocking element 33 due to gravity in this respect represents the unlatched position of the blocking elements 33 since the blocking elements 33 are admittedly at least partly received in the outer groove 37 of the fastening element 23 in this position, but do not engage into the inner groove 39 of the cover sleeve 25. The blocking of the cover sleeve 25 is consequently canceled so that the cover sleeve 25 can be transposed into the open position shown in FIG. 3C.

In this open position, the engagement section 31 of the fastening element 23 is then freely accessible such that the fastening element 23 can be unscrewed from the counter-element 15 via an actuation of the engagement section 31. This can in particular take place by means of a suitable screw wrench. The fastening element 23 can, however, generally also be configured to be released from the counter-element 15 without a tool.

Figure 3B:
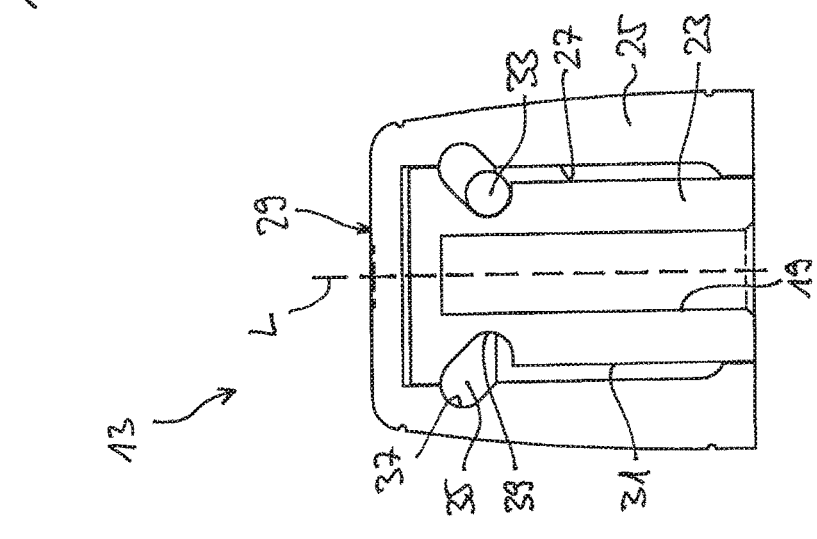
Figure 3A:
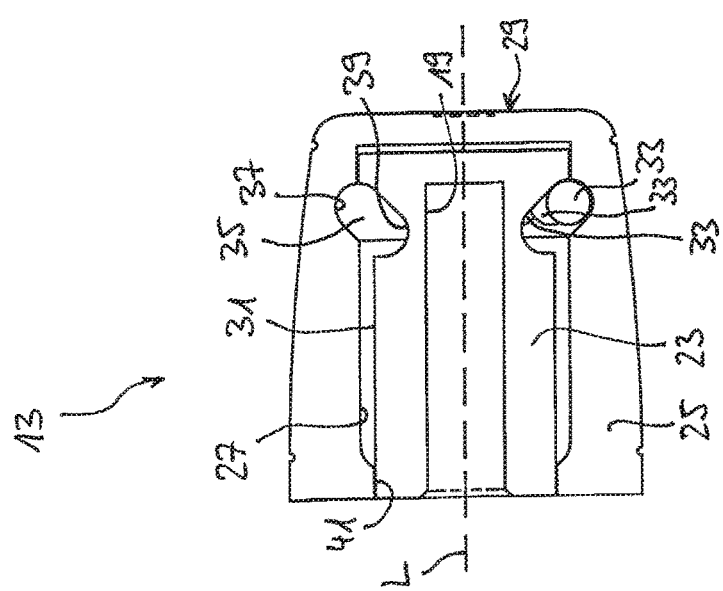

As can in particular be recognized in FIG. 3C, the reception section 27 has a diameter reducing portion 41 which abuts the blocking elements 33 in the open position. It is thereby prevented that the cover sleeve 25 can be completely released from the fastening element 23 and can be lost.

REFERENCE NUMERAL LIST 11 fastening device
13 securing device 15 counter-element
17 head
19 threaded bore
21 external thread
23 fastening element
25 cover sleeve
27 reception section
29 end face
31 engagement section
33 blocking element
35 ring channel
37 outer groove
39 inner groove
41 diameter reducing portion
L longitudinal axis

The invention claimed is:

1. A securing device (13) for securing a component to an object, in particular to a two-wheeler, comprising
a fastening element (23) having an engagement section (31) and a longitudinal axis (L), wherein the fastening element (23) is selectively connectable to a counter-element (15) by actuating the engagement section (31) in order to fasten the component to the object in a connected state and to release the component for removal from the object in a disconnected state;
and a cover sleeve (25) which is movably supported at the fastening element (23) between a closed position in which the cover sleeve (25) prevents an actuation of the engagement section (31) and an open position in which the cover sleeve (25) allows an actuation of the engagement section (31),
wherein at least one blocking element (33) is provided between the fastening element (23) and the cover sleeve (25), said blocking element being freely movable in the closed position of the cover sleeve (25) between a latched position in which it blocks the cover sleeve (25) in the closed position and an unlatched position in which it allows a movement of the cover sleeve (25) into the open position; and
wherein the blocking element (33) is supported between the fastening element (23) and the cover sleeve (25) such that, when the cover sleeve (25) is in the closed position, it adopts the latched position due to gravity in a normal alignment of the longitudinal axis (L) of the fastening element (23) and it adopts the unlatched position due to gravity in an installation alignment of the longitudinal axis (L) of the fastening element (23) perpendicular to the normal alignment,
wherein the blocking element (33) is supported between the fastening element (23) and the cover sleeve (25) such that it adopts the latched position and the unlatched position independently of a rotational alignment of the fastening element (23) relative to the longitudinal axis (L).

2. A securing device in accordance with claim 1, wherein the longitudinal axis (L) of the fastening element (23) extends in the horizontal direction in the normal alignment and in the vertical direction in the installation alignment.

3. A securing device in accordance with claim 1, wherein the cover sleeve (25) is supported at the fastening element (23) movably along the longitudinal axis (L) of the fastening element (23) between the closed position and the open position.

4. A securing device in accordance with claim 1, wherein the cover sleeve (25) has a reception section (27) into which the fastening element (23) is received; and wherein the engagement section (31) of the fastening element (23) is completely received in the reception section (27) of the cover sleeve (25) in the closed position.

5. A securing device in accordance with claim 4, wherein the reception section (27) has a diameter reducing portion (41) against which the blocking element (33) abuts when the cover sleeve (25) is in the open position to prevent a release of the cover sleeve (25) from the fastening element (23).

6. A securing device in accordance with claim 1, wherein the fastening element (23) is configured to be rotated about the longitudinal axis (L) for connection to the counter-element (15).

7. A securing device in accordance with claim 1, wherein the cover sleeve (25) is supported at the fastening element (23) freely rotatable about the longitudinal axis (L).

8. A securing device in accordance with claim 1, wherein the latched position and the unlatched position of the blocking element (33) differ both with respect to their radial arrangement and with respect to their axial position relative to the longitudinal axis (L).

9. A securing device in accordance with claim 1, wherein the latched position and the unlatched position of the blocking element (33) are aligned obliquely to one another with respect to the longitudinal axis (L).

10. A securing device in accordance with claim 1, wherein the fastening element (23) has an outer groove (37) which runs around the longitudinal axis (L) and which is configured to at least partly receive the blocking element (33); and
wherein a cross-section of the outer groove (37) has a longitudinal extent which is aligned at least sectionally obliquely with respect to the longitudinal axis (L) of the fastening element (23).

11. A securing device in accordance with claim 1, wherein the cover sleeve (25) has an inner groove (39) which runs around the longitudinal axis (L) and which is configured to at least partly receive the blocking element (33); and
wherein a cross-section of the inner groove (39) has a longitudinal extent which is aligned at least sectionally obliquely with respect to the longitudinal axis (L) of the fastening element (23).

12. A securing device in accordance with claim 1, wherein the fastening element (23) has an outer groove (37) which runs around the longitudinal axis (L) and which is configured to at least partly receive the blocking element (33);
wherein the cover sleeve (25) has an inner groove (39) which runs around the longitudinal axis (L) and which is configured to at least partly receive the blocking element (33); and
wherein the blocking element (33) is partly received in the outer groove (37) of the fastening element (23) and is partly received in the inner groove (39) of the cover sleeve (25) when the cover sleeve (25) is in the closed position and the longitudinal axis (L) of the fastening element (23) is in the normal alignment.

13. A securing device in accordance with claim 12, wherein the blocking element (33) is at least partly received in the outer groove (37) of the fastening element (23) without engaging into the inner groove (39) of the cover sleeve (25) when the longitudinal axis (L) of the fastening element (23) is in the installation alignment.

14. A securing device in accordance with claim 1,
wherein the fastening element (23) has an outer groove (37) which runs around the longitudinal axis (L) and which is configured to at least partly receive the blocking element (33);
wherein the cover sleeve (25) has an inner groove (39) which runs around the longitudinal axis (L) and which is configured to at least partly receive the blocking element (33); and
wherein the outer groove (37) of the fastening element (23) and the inner groove (39) of the cover sleeve (25) form a ring channel (35) in the closed position of the cover sleeve (25), with the blocking element (33) being supported freely movable in said ring channel (35).

15. A securing device in accordance with claim 14,
wherein the ring channel (35) is rotationally symmetrical with respect to the longitudinal axis (L).

16. A securing device in accordance with claim 14,
wherein a cross-section of the ring channel (35) has a longitudinal extent (L) along which the blocking element (33) is linearly movable between the latched position and the unlatched position and which is aligned obliquely to the longitudinal axis (L).

17. A securing device in accordance with claim 14,
wherein a plurality of blocking elements (33) are provided which, strung together, extend over at least a third of the periphery of the ring channel (35).

18. A fastening device (11) for fastening a component to an object, in particular to a two-wheeler,
comprising a securing device (13) in accordance with claim 1;
and the counter-element (15) to which the fastening element (23) is selectively connectable.

19. A securing device (13) for securing a component to an object, in particular to a two-wheeler, comprising
a fastening element (23) having an engagement section (31) and a longitudinal axis (L), wherein the fastening element (23) is selectively connectable to a counter-element (15) by actuating the engagement section (31) in order to fasten the component to the object in a connected state and to release the component for removal from the object in a disconnected state;
and a cover sleeve (25) which is movably supported at the fastening element (23) between a closed position in which the cover sleeve (25) prevents an actuation of the engagement section (31) and an open position in which the cover sleeve (25) allows an actuation of the engagement section (31),
wherein at least one blocking element (33) is provided between the fastening element (23) and the cover sleeve (25), said blocking element being freely movable in the closed position of the cover sleeve (25) between a latched position in which it blocks the cover sleeve (25) in the closed position and an unlatched position in which it allows a movement of the cover sleeve (25) into the open position; and
wherein the blocking element (33) is supported between the fastening element (23) and the cover sleeve (25) such that, when the cover sleeve (25) is in the closed position, it adopts the latched position due to gravity in a normal alignment of the longitudinal axis (L) of the fastening element (23) and it adopts the unlatched position due to gravity in an installation alignment of the longitudinal axis (L) of the fastening element (23) perpendicular to the normal alignment, wherein the longitudinal axis (L) of the fastening element (23) extends in the horizontal direction in the normal alignment and in the vertical direction in the installation alignment.

20. A securing device (13) for securing a component to an object, in particular to a two-wheeler, comprising
a fastening element (23) having an engagement section (31) and a longitudinal axis (L), wherein the fastening element (23) is selectively connectable to a counter-element (15) by actuating the engagement section (31) in order to fasten the component to the object in a connected state and to release the component for removal from the object in a disconnected state;
and a cover sleeve (25) which is movably supported at the fastening element (23) between a closed position in which the cover sleeve (25) prevents an actuation of the engagement section (31) and an open position in which the cover sleeve (25) allows an actuation of the engagement section (31),
wherein at least one blocking element (33) is provided between the fastening element (23) and the cover sleeve (25), said blocking element being freely movable in the closed position of the cover sleeve (25) between a latched position in which it blocks the cover sleeve (25) in the closed position and an unlatched position in which it allows a movement of the cover sleeve (25) into the open position; and
wherein the blocking element (33) is supported between the fastening element (23) and the cover sleeve (25) such that, when the cover sleeve (25) is in the closed position, it adopts the latched position due to gravity in a normal alignment of the longitudinal axis (L) of the fastening element (23) and it adopts the unlatched position due to gravity in an installation alignment of the longitudinal axis (L) of the fastening element (23) perpendicular to the normal alignment, wherein the latched position and the unlatched position of the blocking element (33) are aligned obliquely to one another with respect to the longitudinal axis (L).

* * * * *